3,419,586
PRODUCTION OF C$_{18}$ CYCLIC ACIDS
IN AQUEOUS SOLVENT
Robert E. Beal, Elmwood, and Roger A. Eisenhauer, East Peoria, Ill., assignors to the United States of America as represented by the Secretary of Agriculture
No Drawing. Filed Apr. 21, 1966, Ser. No. 544,088
1 Claim. (Cl. 260—405.6)

ABSTRACT OF THE DISCLOSURE

Commercial yields of linolenic-derived, monomeric C$_{18}$ conjugated cyclohexadiene monocarboxylic acid isomers are obtained in a completely aqueous reaction medium by isomerizing and cyclizing linseed oil or methyl linolenate in excess alkali at a temperature of 295–300° C.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to the unobvious discovery that commercially advantageous yields of the linolenic-derived monomeric C$_{18}$ conjugated cyclohexadiene monocarboxylic acid isomers are obtained in a completely aqueous reaction solvent by subjecting linseed oil or methyl linolenate at 295–300° C. to the isomerizing and cyclizing actions of excess alkali. Heretofore, the reaction was carried out in ethylene glycol per se or in a water-scavenging alkali metal salt of ethylene glycol. Although the prior art process produces greater yields of cyclic acids, the process of this invention eliminates the added equipment, personnel, steps, and cost required for recovering and purifying most but even under the best conditions, not all of the costly ethylene glycol solvent.

U.S. Patent No. 3,041,360 issued to Scholfield et al. of this laboratory teaches the practical isomerization of linseed oil or of methyl linolenate to cyclic acids by excess alkali at 200–250° C. in a glycol solvent, which solvent was tried after attempts by others at this laboratory to produce the cyclic acids in an aqueous reaction medium at 225° C. gave the cyclic acids in a commercially inoperative yield amounting to only 20 percent calculated on the content of linolenic acid.

Scholfield et al. continuation-in-part Patent 3,119,850 teaches that greatly improved yields of the mixed cyclic acid monomers are obtained when a prolonged alkali isomerization and cyclization of the linseed material is conducted in anhydrous ethylene glycol and particularly when part of the reaction solvent is a hygroscopic ethylene glycol alkali metal salt that serves to scavenge the small amount of water formed by molecular condensations of the ethylene glycol, thereby suggesting that extremely poor yields of the desired monomeric cyclic acids would be obtained in an aqueous system. Despite the good yields of the saturated C$_{18}$ cyclic acid isomers in the anyhdrous glycol reaction medium, i.e., 42.7 lbs. per 100 lbs. of linseed oil, careful calculations show that the per pound cost of making the cyclic acids by the glycol process in an efficiently designed plant making 4 million pounds of the cyclic acids per year would be practically 44 cents because of the additional labor, processing steps, equipment, and time required for recovering the bulk of the glycol by distillation, the need to hydrolyze byproduct glycol esters of the cyclic acids, and the loss of glycol by polymer formation.

A primary object of the present invention is the discovery of critical reaction conditions for obtaining commercially attractive yields of the C$_{18}$ cyclic acid monomers in an aqueous solvent whereby sufficiently improved yields of the said cyclic acids are obtained directly and with freedom from the costs involved in the use of an organic solvent, so that a distinct cost advantage is obtained. A more specific object is an alkali isomerization process whereby linolenic acid, methyl linolenate, or linseed oil is directly and efficiently transformed to the unsaturated cyclic acids in an aqueous reaction solvent at a net cost advantage of roughly 10 cents per pound over the cost of forming the cyclic acids formed in an ethylene glycol solvent. Other objects and advantages of our invention will be readily apparent from the following detailed disclosure.

In accordance with the stated objects of our invention we have now surprisingly discovered that linseed oil, the mixed linseed fatty acids, or methyl linolenate can be efficiently cyclized in an aqueous medium to the mixed monomeric C$_{18}$ cyclic acids provided the ratio of water to linseed oil or linseed acids is from 4:1 to 6:1, the excess of alkali is about 100 percent and the reaction is conducted at a temperature of 295–300° C. When the above conditions are employed for as little as 15 minutes, 36.7 g. of the monomeric cyclic acids are obtained from 100 g. of linseed oil, equivalent to 70 percent of theory based on the linolenic acid content, the elimination of the equipment and steps for conserving and recovering the ethylene glycol thereby resulting in lowering the per pound cost of producing the unsaturated cyclic acid monomers to about 33 cents.

The following example illustrates the practice of our improved process.

EXAMPLE 1

A 1-liter capacity stainless steel autoclave having external heating means and a vertically reciprocating magnetically driven agitator was charged with 100 g. of linseed oil containing 52 g. of linolenic acid, 27.6 g. of NaOH (100% excess over that required for saponification), and 600 g. of distilled water (6:1 w./w. ratio of solvent to oil). After charging the residual air space with pressurized nitrogen, the autoclave was gradually heated to 295° C. (about 1 hour), and the reactants were maintained at this temperature for 15 minutes. The autoclave was cooled to room temperature and the fatty acids freed from their soaps by neutralization with H$_2$SO$_4$. The thusly freed carboxylic acids were extracted in petroleum ether, the ethereal layer was freed of mineral acid with water and then dried before flashing the ether solvent to give 95.5 g. of crude unsaturated C$_{18}$ cyclic acids. Vacuum distillation of the crude material gave 81.7 g. of a mixture consisting of the monomeric cyclic acids and straight chain aliphatic acids and 13.8 g. of nondistillable polymeric cyclic acids (predominantly dimers and a scanty amount of trimers). The unsaturated cyclic monomer-aliphatic acid fraction was hydrogenated in the presence of a supported palladium catalyst, and the 45.5 g. of saturated aliphatic acids were separated therefrom by adduction with urea, leaving 36.7 g. of pure saturated C$_{18}$ cyclic acid monomers corresponding to a 70.2% yield. It is apparent that it would be advantageous in a commercial operation to first isolate the glycerol and fatty acids to avoid having to recover the byproduct glycerol under adverse conditions and to avoid possible thermal damage to the glycerol.

EXAMPLE 2

Example 1 was repeated excepting that the linseed oil reactant was increased to 150 g. and the NaOH was correspondingly increased to 41 g., the water being retained at 600 ml. (4:1 ratio of reaction solvent to oil). However, the reaction time at 295° C. was increased to 45 minutes. The 54.6 g. yield of saturated cyclic acids corresponded to 69.9% of theory based on the linolenic acid content of the linseed oil.

EXAMPLE 3

When Example 2 was repeated, excepting that the reaction temperature was lowered to 250° C., although the time of reaction at that temperature was prolonged to 4 hours, only 78.0 g. of hydrogenated cyclic acids were obtained, corresponding to a 51.9 percent yield.

EXAMPLE 4

150 g. of the mixed fatty acids obtained from the particular batch of linseed oil used in the preceding examples along with 41.0 g. of NaOH (88% excess) and 600 ml. of distilled water were reacted under nitrogen in the previously described autoclave for 15 minutes at 295° C. There were obtained 49.0 g. of hydrogenated $C_{18}$ cyclic acids equivalent to a 67.5 percent yield.

We claim:
1. An equeous process for obtaining the linolenic acid-derived monomeric $C_{18}$ cyclic acid isomers in yields amounting to about 70 percent of theory comprising reacting a linolenic acid containing member selected from the group consisting of linseed oil and the mixed fatty acids derived from linseed oil with a 50–100% excess of NaOH above the amount required for saponification at about 295–300° C. for at least 15 minutes in a reaction solvent consisting of 4–6 parts by weight of water per part by weight of a said linolenic acid-containing member, and recovering the said monomeric $C_{18}$ cyclic acids from the reaction mixture.

References Cited

UNITED STATES PATENTS 3,119,850   1/1964   Scholfield et al. ___ 260—405.6

ALEX MAZEL, *Primary Examiner.*

R. J. GALLAGHER, *Assistant Examiner.*